(12) United States Patent
Peters

(10) Patent No.: US 8,230,335 B2
(45) Date of Patent: Jul. 24, 2012

(54) ENHANCED VISUAL REPRESENTATIONS OF COMPANY RELATED DATA AND GENERATION OF VIRTUAL BUSINESS CARDS

(75) Inventor: Johan Christiaan Peters, Baden-Württemberg (DE)

(73) Assignee: SAP AG, Walldorf (DE)

( * ) Notice: Subject to any disclaimer, the term of this patent is extended or adjusted under 35 U.S.C. 154(b) by 541 days.

(21) Appl. No.: 12/324,036

(22) Filed: Nov. 26, 2008

(65) Prior Publication Data
US 2010/0131834 A1     May 27, 2010

(51) Int. Cl.
*G06F 170/60*     (2006.01)
(52) U.S. Cl. .......................................... 715/255; 705/1.1
(58) Field of Classification Search .................... 715/202
See application file for complete search history.

(56) References Cited

U.S. PATENT DOCUMENTS

| | | | |
|---|---|---|---|
| 7,757,168 B1 * | 7/2010 | Shanahan et al. | 715/255 |
| 2006/0293904 A1 * | 12/2006 | Ramanathan et al. | 705/1 |
| 2008/0158612 A1 * | 7/2008 | Iwasaki | 358/3.26 |
| 2008/0275748 A1 * | 11/2008 | John | 705/7 |

* cited by examiner

*Primary Examiner* — Doug Hutton, Jr.
*Assistant Examiner* — Andrew McIntosh
(74) *Attorney, Agent, or Firm* — Mintz, Levin, Cohn, Ferris, Glovsky and Popeo, P.C.

(57) ABSTRACT

Data characterizing contact information for an individual is obtained. Thereafter, the contact information is associated with a company identifier for a company. A remote data source is then polled to obtain at least one graphical image characterizing a logo for the company so that a virtual business card containing the at least one graphical image and the contact information can be generated and displayed. In some implementations, other information from a remote data source can be used to generate a background portion of a virtual business card. Related apparatus, systems, techniques and articles are also described.

19 Claims, 3 Drawing Sheets

ENHANCED VISUAL REPRESENTATIONS OF COMPANY RELATED DATA AND GENERATION OF VIRTUAL BUSINESS CARDS

TECHNICAL FIELD

The subject matter described herein relates to visually representing data associated with a company to enhance visual representations which in turns improves usability.

BACKGROUND

Business data, and in particular, contact data, is an essential resource for effectively communicating with customers and partners. As the amounts of business data increase, so does the difficulty, from a user perspective, in visually understanding relevant relationships among various entities such as companies or other groups.

SUMMARY

In one aspect, data characterizing contact information for an individual is obtained. Thereafter, the contact information is associated with a company identifier for a company. A remote data source is then polled to obtain at least one graphical image characterizing a logo for the company so that a virtual business card containing the at least one graphical image and the contact information can be generated and displayed.

The company identifier can, for example, be a company name entry in the contact information, a company URL, or it can be a hostname portion of an e-mail address. In other variations, the company identifier can be an identification such as a Dun & Bradstreet number or Chamber of Commerce number (which requires that such databases containing such numbers be polled in order to identify the corresponding company or company website).

The remote data source can additionally be polled to obtain data characterizing a background image for the website and a background portion of the virtual business card over which the contact information is displayed can be based on the background image. The background image can be based on all or a portion of the background image (e.g., screen shot)—and such selection can, in some variations, be user-generated (while in other variations the selection is automated).

The contact information can be obtained in a variety of manners, including, for example, input by a user via a graphical user interface, as a vcard or e-mail signature, from a contacts database, and the like.

In cases in which there are more than two graphical images for either the background or for the logo, such two or more graphical images can be displayed in a graphical user interface. A user can the select one of the two or more displayed graphical images via the graphical user interface for display in the virtual business card. In other variations, a logo can be automatically selected based on predetermined criteria (size of file, location on web page, etc.).

It can, in some implementations, be determined whether a graphical image characterizing the logo for the company has already been obtained. If that is the case, the polled remote data source can be a contacts database if it has been determined that the graphical image characterizing the logo for the company has already been obtained or the polled remote data source can be a website if it has been determined that the graphical image characterizing the logo for the company has not already been obtained.

Polling a remote data source can comprises searching a website associated with the company identifier (e.g., URL, hostname, etc.) to obtain graphical images. For a logo, the graphical images can be identified by tags for images on the website. In addition, the website can be used to provide a background image (which can, in some variations, be later filtered) for inclusion in the virtual business card. In some implementations, a user can modify an obtained graphical image for a logo, or he or she can provide their own logo.

The remote data source can also comprise an image search engine to obtain graphical images associated with the company identifier.

In an interrelated aspect, business data including alphanumeric text characterizing a company and a company identifier can be received which results in a remote data source being polled to obtain at least one graphical image characterizing a logo associated with the company identifier. A representation of the business data can then be generated and displayed that contains the at least one graphical image and at least a portion of the alphanumeric text characterizing the company.

In still a further interrelated aspect, business data including a company identifier comprising one or more of a URL and an e-mail address containing a hostname can be received. It is then determined whether a background image and a logo image already exists for a company associated with the company identifier. If it is determined that the background image does not already exist for the company, a screen shot of a web page identified by the company identifier can be obtained and visually filtered. If it is determined that the logo image does not already exist for the company, the web page identified by the company identifier can be searched to obtain an image identified as a logo which can be visually filtered. If it is determined the background image already exists for the company, a database can be polled to obtain the background image. If it is determined the logo image already exists for the company, the database can be polled to obtain the logo image. Once the background image and the logo image are obtained or generated, a representation of the business data including the logo image and the background image can be generated and displayed in which the business data is overlaid on at least a portion of background image.

Articles are also described that comprise a machine-readable storage medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, the current subject matter can allow for an automatic visual representation of a company or other company related business objects and data (leads, sales order, contacts, forms, etc.). The visual representation can enhance a user experience by allowing for higher data density, combining multiple dimensions in a single graph, allowing for the characterization of company information using means other than text, increased usability by making data more easily understood and allowing for increased pattern recognition in data (i.e., company related data can be more easily identified), and more.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
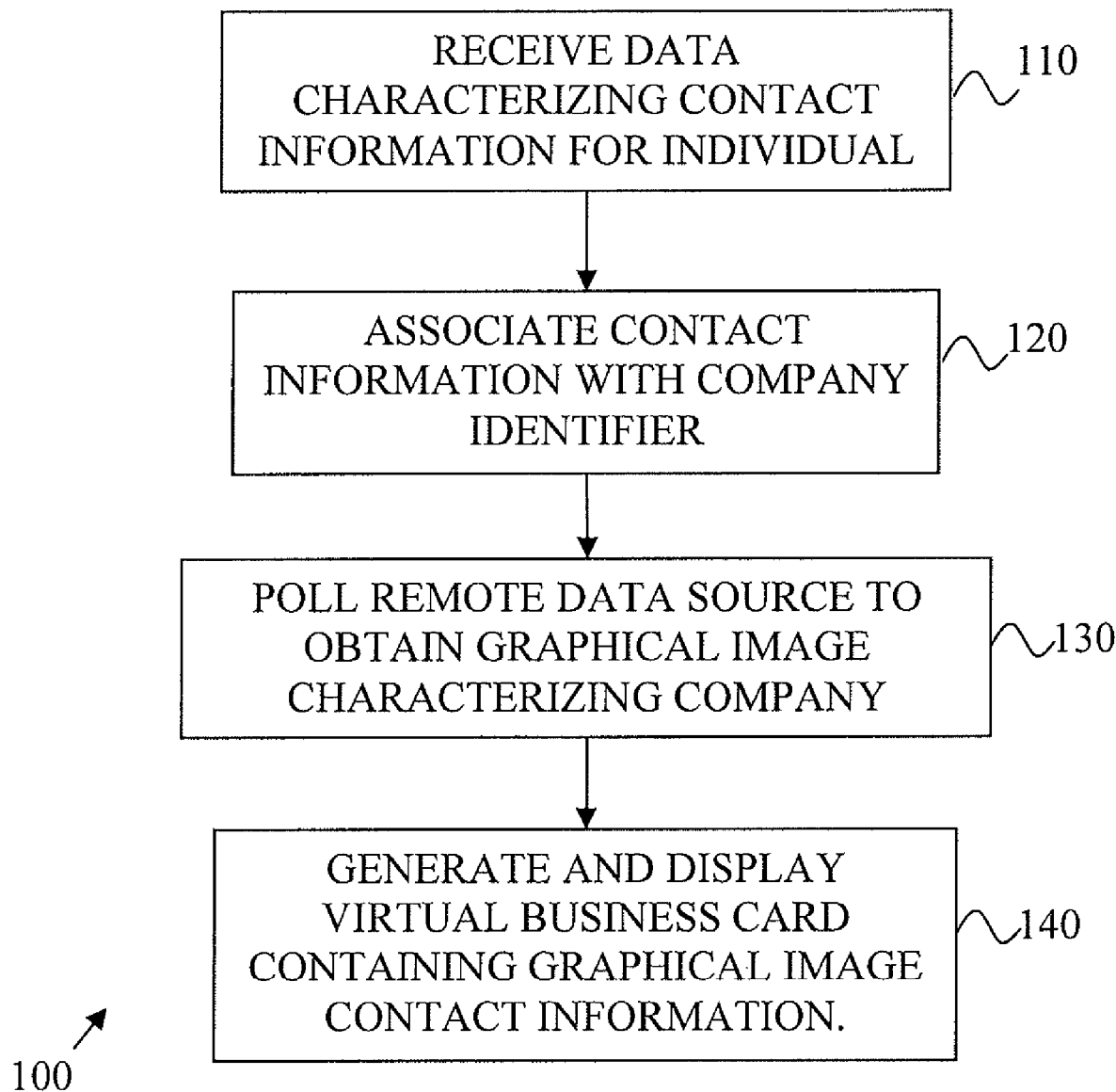
FIG. 1 is a process flow diagram illustrating the generation and display of a virtual business card.

FIG. 1 is a process flow diagram illustrating a method 100 in which, at 110, data characterizing contact information for an individual is received. Thereafter, at 120, the contact information is associated with a company identifier for a company. A remote data source is subsequently polled, at 130, to obtain at least one graphical image characterizing a logo for the company. A virtual business card that contains the at least one graphical image and the contact information is later, at 140, displayed and generated.

Visual identifiers can be helpful, in a usability context, in order to allow a user to distinguish business affiliations and other differentiators amongst business data. The current subject matter, in some implementations, utilizes rich data available on web pages associated with companies in order to generate visual documents (such as virtual business cards) that are based on publicly available visual identifiers such as logos. For example, most company web pages contain many unique visual identifiers, particularly in the top 25% of a web page, such as logo, color schemes, etc.

Figure 2:
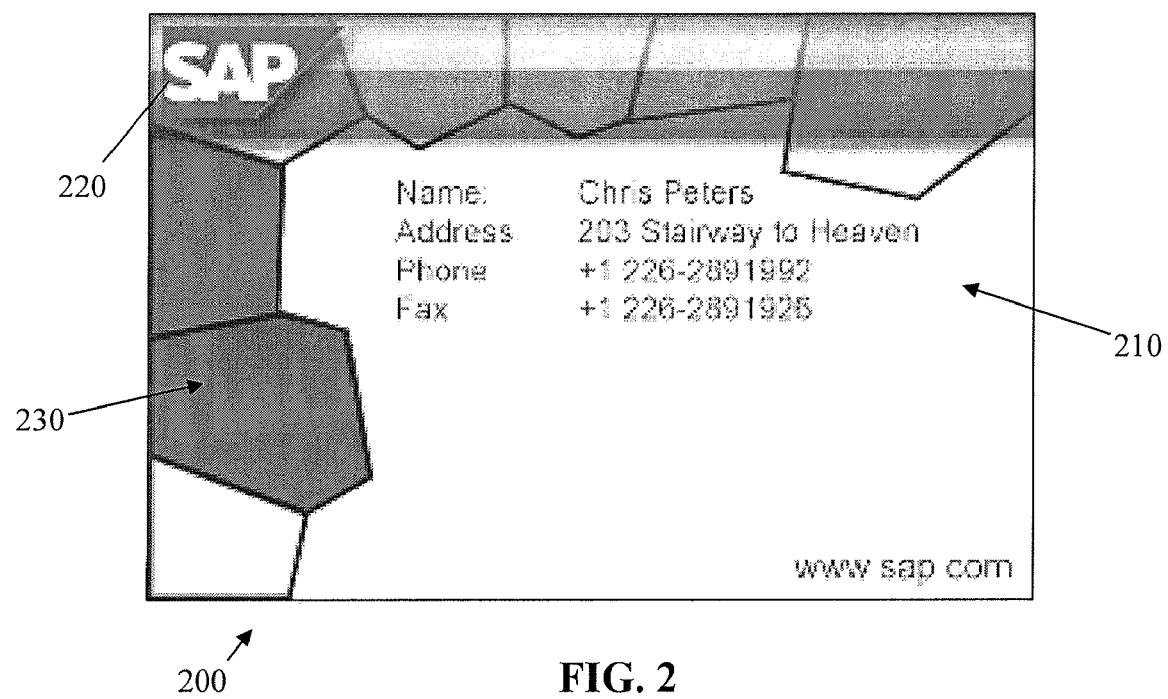
FIG. 2 is a diagram illustrating a virtual business card.

FIG. 2 illustrates a sample virtual business card 200 that includes contact information 210 for an individual. Such contact information 210 can be manually input, obtained from a .vcard, harvested from an e-mail signature, obtained from a contact database, and the like. A visual identifier 220 is included (in this case a company logo) which is obtained by polling a remote database such as a web page associated with the company (as identified from the contact information 210) or a contacts database (if a visual identifier has already been obtained for a different individual at the same company, etc.). The virtual business card 200 can also include a visually distinctive background 230 which is an abstraction of one or more of a logo for the company or a background (e.g., color scheme, etc.) obtained from a web page for the company. In this example, a stained-glass filter is applied to a screenshot of the web page. With such a technique, differing web pages will result in different backgrounds 230 (to further assist in the visual differentiation of sources of business data)—thereby resulting in different "fingerprints" for the virtual business cards for the respective companies that provide an abstract rendering that maintains the essence of the visual style for the company.

Figure 3:
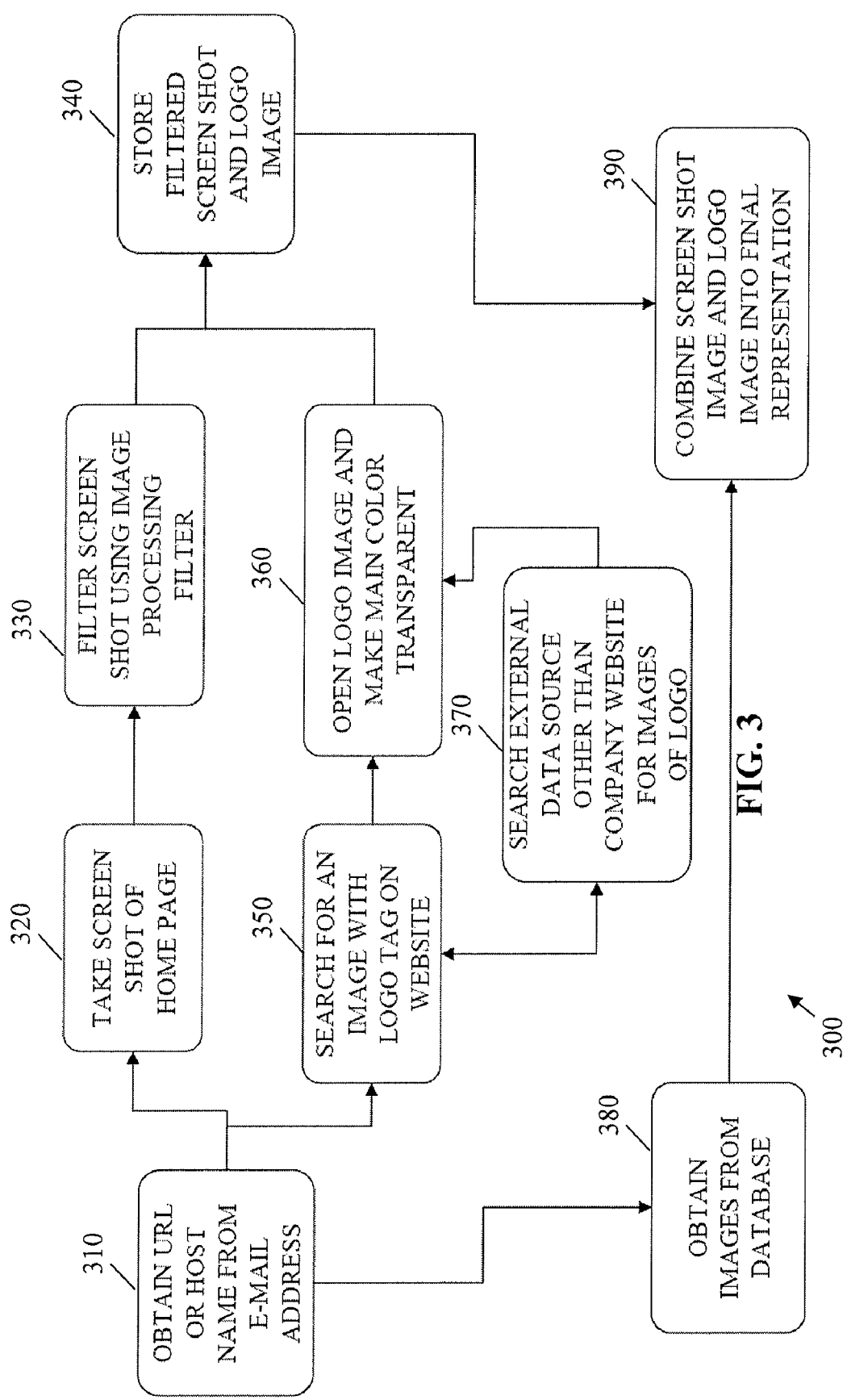
FIG. 3 is a process flow diagram illustrating an example technique for obtaining a logo and a background image for a virtual business card.

FIG. 3 is a process flow diagram 300 that illustrates techniques for generating a virtual business card or other visual document that contains both business data and graphical images that are obtained from a source external to the source of the business data. For example, at 310, a URL or a host name can be obtained from an e-mail address. If the URL or host name corresponds to a company in which there are not any previously obtained, a screen shot of a homepage (or other page if the URL points elsewhere) is taken at 320. This screen shot is filtered, at 330, using an image processing filter. In addition, at 350, the website of the company (as defined by the URL or host name), is searched in order to obtain a logo image. For example, all images can be searched in order to locate one that includes a tag "logo" or the like. If the website does not include an image with a tag identifying it as a logo, then an external source, such as an image search engine (e.g., GOOGLE Images, etc.) can be polled, at 370, to obtain an image. Thereafter, at 360, the logo image, can be modified to make it compatible with the end use (e.g., virtual business card, etc.). One example of a visual modification would be to increase a level of transparency of a main color of the logo. The filtered screen shot and the modified logo image can, at 340, be stored, so that such images can be later combined, at 390, to generate a final representation of the business data (e.g., a virtual business card with the modified logo, a background containing the filtered screen as a background, with the business data overlaying the background). In some instances, a filtered screen shot and a modified logo may have already been obtained for a particular company. In such instances, the images can, at 380, be obtained from a database so that, at 390, the filtered screen shot and logo can be combined to result in a final representation of such information with the business data.

In some cases, more than one graphical image might be obtained for either the logo or the background. In such cases, the user can be presented with an interface displaying multiple images and allowing the user to select one or more of the images for inclusion in the final representation of the business data. In addition, a user can, in some cases, be permitted to only select a portion of the graphical image (whether it be a website screenshot or logo). Moreover, in some cases, the user can upload its own designated image (either for the logo portion or the background portion)—thereby obviating the need to poll a remote data source such as a website or image search engine to obtain such an image.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, while the foregoing generally relates to virtual business cards, it will be appreciated that the techniques described herein can be applicable to any type of visual representation of business data that needs to be differentiated by company or other groups. Other embodiments may be within the scope of the following claims.

What is claimed is:

1. An article comprising a non-transitory machine-readable storage medium embodying instructions that when performed by one or more machines result in operations comprising:
    receiving contact information for an individual;
    associating the contact information with a company identifier for a company;
    identifying a publicly available remote data source associated with the company identifier;
    polling, using the company identifier, the remote data source to obtain at least one graphical image configured to characterize a logo for the company and at least one background image configured to characterize a website of the company;
    modifying the obtained logo to make it compatible for use in a virtual business card;
    filtering the obtained at least one background image;
    determining whether the modified logo and the filtered background image have been previously obtained for the company;
    combining the modified logo and the filtered background image, wherein the modified logo and the filtered background image comprise at least one of the following: a previously modified logo, a previously filtered background image, a newly modified logo, and a newly filtered background image; and
    generating, based on the combining, the virtual business card, and displaying the virtual business card containing the at least one graphical image and the contact information the modified logo, and the filtered background image.

2. An article as in claim 1, wherein the company identifier is a company name entry in the contact information.

3. An article as in claim 1, wherein the company identifier is a URL contained within the contact information.

4. An article as in claim 1, wherein the company identifier is a hostname portion of an e-mail address.

5. An article as in claim 1, wherein the company identifier is a unique alphanumeric identifier, and wherein the tangible machine-readable storage medium further embodies instructions that when performed by one or more machines result in operations comprising:
    polling a remote database to associate the unique alphanumeric identifier with a URL for the company.

6. An article as in claim 4, wherein the polled remote data source is a website having a domain name encapsulating the hostname portion of the e-mail address.

7. An article as in claim 1, wherein the tangible machine readable storage medium further embodies instructions that when performed by one or more machines result in operations comprising:
    polling the remote data source to obtain data configured to characterize the at least one background image for the website;
    wherein the virtual business card includes a background portion over which the contact information is displayed that is based on the at least one background image.

8. An article as in claim 7, wherein the background image is a screen shot of at least a portion of a page of the website.

9. An article as in claim 7, wherein the tangible machine-readable storage medium further embodies instructions that when performed by one or more machines result in operations comprising:
    visually filtering at least a portion of a screen shot of the website to generate the background image.

10. An article as in claim 7, wherein the tangible machine readable storage medium further embodies instructions that when performed by one or more machines result in operations comprising:
    receiving user-generated input selection of a portion of the screen shot of the website to generate the background image.

11. An article as in claim 1, wherein the tangible machine-readable storage medium further embodies instructions that when performed by one or more machines result in operations comprising: receiving user-generated input via a graphical user interface including the contact information.

12. An article as in claim 1, wherein the tangible machine-readable storage medium further embodies instructions that when performed by one or more machines result in operations comprising:
    displaying two or more graphical images obtained from the remote data source in a graphical user interface; and
    receiving user-generated input selecting one of the two or more displayed graphical images via the graphical user interface;
    wherein the virtual business card includes the selected displayed graphical image.

13. An article as in claim 1, wherein the polling a remote data source comprises searching a website associated with the company identifier to obtain graphical images.

14. An article as in claim 13, wherein the graphical images contain a tag identifying such images as logos.

15. An article as in claim 1, wherein the polling a remote data source comprises polling an image search engine to obtain graphical images associated with the company identifier.

16. An article as in claim 1, wherein the tangible machine readable storage medium further embodies instructions that when performed by one or more machines result in operations comprising:

receiving user-generated input modifying the at least one graphical image configured to characterize the logo for the company;

wherein the modified at least one graphical image is used for the virtual business card.

17. An article comprising a non-transitory machine-readable storage medium embodying instructions that when performed by one or more machines result in operations comprising:

receiving business data including alphanumeric text configured to characterize a company and a company identifier;

identifying a publicly available remote data source using the alphanumeric text; polling, using the company identifier, a remote data source to obtain at least one graphical image configured to characterize a logo associated with the company identifier and at least one background image configured to characterize a website of the company;

modifying the obtained logo to make it compatible for use in a representation of the business data;

filtering the obtained at least one background image;

determining whether the modified logo and the filtered background image have been previously obtained for the company;

combining the modified logo and the filtered background image, wherein the modified logo and the filtered background image comprise at least one of the following: a previously modified logo, a previously filtered background image, a newly modified logo, and a newly filtered background image; and generating, based on the combining, the representation of the business data, and displaying a representation of the business data containing the at least one graphical image and at least a portion of the alphanumeric text characterizing the company, the modified logo, and the filtered background image.

18. An article as in claim 14, wherein the tangible machine-readable storage medium further embodies instructions that when performed by one or more machines result in operations comprising:

polling a website associated with the company identifier to obtain at least one screen shot; and visually filtering at least a portion of the screen shot;

wherein the virtual representation of the business data further comprises the visually filtered screen shot on a visual layer beneath the business data.

19. An article comprising a non-transitory machine-readable storage medium embodying instructions that when performed by one or more machines result in operations comprising:

receiving business data including a company identifier comprising one or more of a URL and an e-mail address containing a hostname;

determining whether a background image and a logo image already exists for a company associated with the company identifier;

obtaining a screen shot of a web page identified by the company identifier, visually filtering the web page to generate the background image, if it is determined that the background image does not already exist for the company;

searching the web page identified by the company identifier to obtain an image identified as a logo, visually filtering the logo image to generate the logo image, if it is determined that the logo image does not already exist for the company;

polling a database to obtain the background image if it is determined the background image already exists for the company;

polling the database to obtain the logo image if it is determined the logo image already exists for the company;

combining the logo image and the background image, wherein the logo image and the background image comprise at least one of the following: an existing logo image, an existing background image, a new logo image, and a new background image; and generating, based on the combining, a representation of the business data including the logo image and the background image, the business data being overlaid on at least a portion of background image.

\* \* \* \* \*